(12) United States Patent
Huang et al.

(10) Patent No.: US 10,300,400 B2
(45) Date of Patent: May 28, 2019

(54) WET EVAPORATION-BASED COLD CONCENTRATION SYSTEM

(71) Applicant: Hunan Dongyou Water Vapor Energy Energy-Saving CO., Ltd, Changsha (CN)

(72) Inventors: Guohe Huang, Changsha (CN); Jianlin Cheng, Changsha (CN); Ruohuang Li, Changsha (CN); Tianfei Huang, Changsha (CN); Zhongwei Li, Changsha (CN)

(73) Assignee: Hunan Dongyou Water Vapor Energy Energy-Saving CO., Ltd, Changsha (CN)

( * ) Notice: Subject to any disclaimer, the term of this patent is extended or adjusted under 35 U.S.C. 154(b) by 67 days.

(21) Appl. No.: 15/658,443

(22) Filed: Jul. 25, 2017

(65) Prior Publication Data
US 2017/0319980 A1    Nov. 9, 2017

Related U.S. Application Data

(63) Continuation of application No. PCT/CN2016/079645, filed on Apr. 19, 2016.

(30) Foreign Application Priority Data

Apr. 20, 2015 (CN) .......................... 2015 1 0186456

(51) Int. Cl.
*B01D 1/16* (2006.01)
*B01D 1/00* (2006.01)
(Continued)

(52) U.S. Cl.
CPC ................ *B01D 1/16* (2013.01); *B01D 1/00* (2013.01); *B01D 1/30* (2013.01); *F24F 5/0007* (2013.01);
(Continued)

(58) Field of Classification Search
CPC .... B01D 1/00; B01D 1/16; B01D 1/30; F24D 19/0095; F24F 5/0007; F24F 6/14;
(Continued)

(56) References Cited

U.S. PATENT DOCUMENTS 7,019,412 B2 * 3/2006 Ruggieri ................. F01K 17/02
290/2
2004/0261440 A1 * 12/2004 Forkosh ................ F24F 3/1417
62/271

FOREIGN PATENT DOCUMENTS

CN    101713579 A    5/2010
CN    201771246 U    3/2011
(Continued)

*Primary Examiner* — Charles S Bushey
(74) *Attorney, Agent, or Firm* — Erson IP

(57) ABSTRACT

The present invention relates to a wet evaporation-based cold concentration system, which is mainly applied to the technical field of air conditioners, and particularly applied to the technical field of heat-source tower heat-pump air conditioners. By utilizing a wet evaporation theory, a low-temperature low-concentration anti-freezing solution is enabled to contact low-temperature air in a wet evaporator to perform the heat and mass transfer, and water in the anti-freezing solution is vaporized at a low temperature into the air, thereby obtaining the high-concentration anti-freezing solution. By reasonably utilizing the concentration pool and the storage pool, the low-concentration anti-freezing solution is separated from the high-concentration anti-freezing solution, thereby achieving a purpose of simultaneously concentrating and storing the anti-freezing solution

4 Claims, 1 Drawing Sheet

(51) Int. Cl.
*B01D 1/30* (2006.01)
*F25B 30/06* (2006.01)
*F25B 47/00* (2006.01)
*F25B 19/04* (2006.01)
*F24F 5/00* (2006.01)
*F24F 6/14* (2006.01)
*F24D 19/00* (2006.01)

(52) U.S. Cl.
CPC ............... *F24F 6/14* (2013.01); *F25B 19/04* (2013.01); *F25B 30/06* (2013.01); *F25B 47/006* (2013.01); *F24D 19/0095* (2013.01); *F25B 2500/31* (2013.01); *Y02B 30/545* (2013.01)

(58) Field of Classification Search
CPC ........ F25B 19/04; F25B 30/06; F25B 47/006; F25B 2500/31; Y02B 30/545

USPC ........................................................ 261/151
See application file for complete search history.

(56) References Cited

FOREIGN PATENT DOCUMENTS

| | | |
|---|---|---|
| CN | 102258876 A | 11/2011 |
| CN | 102759156 A | 10/2012 |
| CN | 103353189 A | 10/2013 |
| CN | 103411351 A | 11/2013 |
| CN | 103644677 A | 3/2014 |
| CN | 104019580 A | 9/2014 |
| CN | 104771918 A | 7/2015 |
| CN | 204522323 U | 8/2015 |
| SU | 238522 A1 | 6/1976 |
| WO | WO 2014/023035 A1 * | 2/2014 |

* cited by examiner

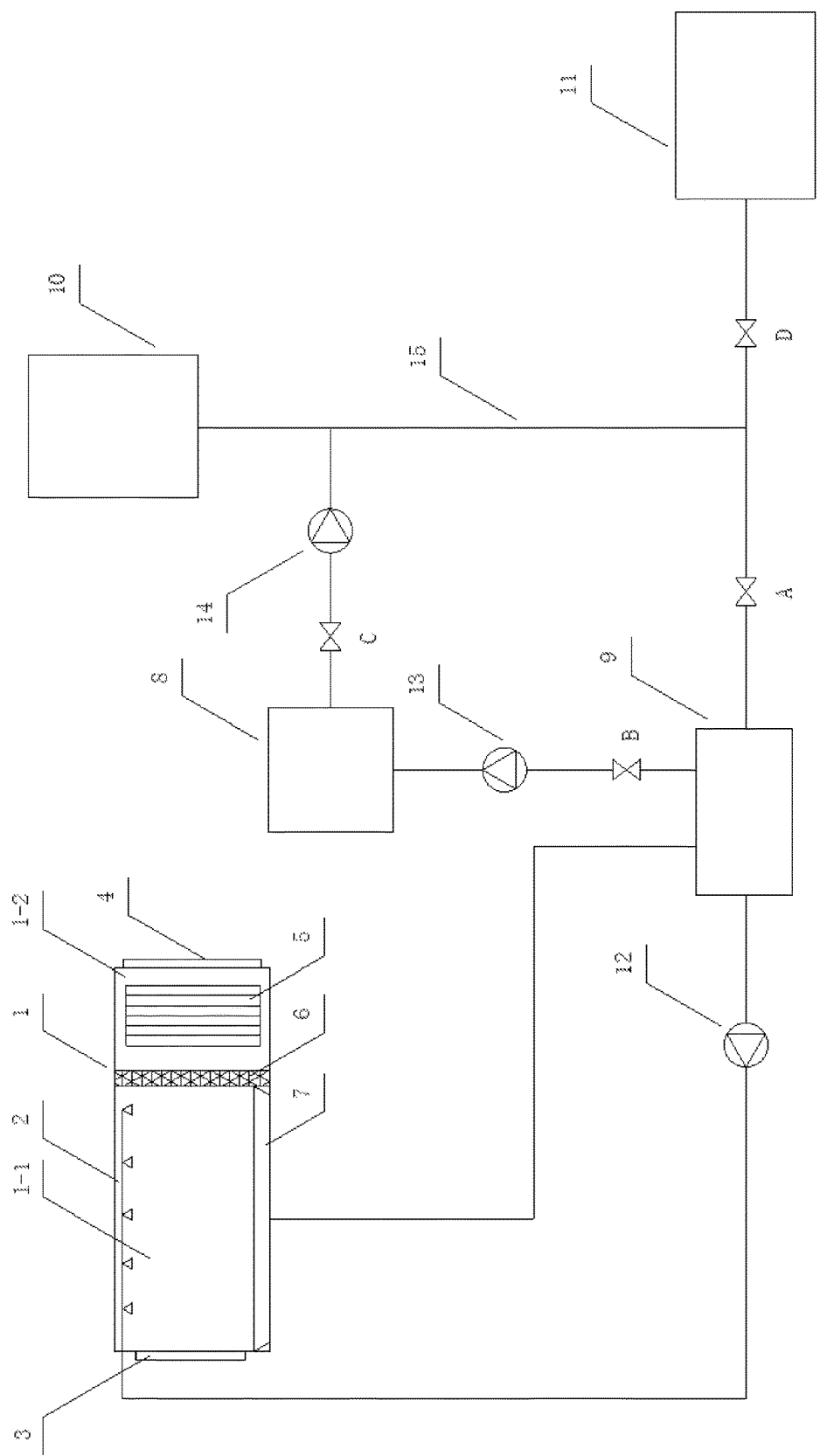

WET EVAPORATION-BASED COLD CONCENTRATION SYSTEM

CROSS-REFERENCE TO RELATED APPLICATIONS

This application is a continuation of International Patent Application No. PCT/CN2016/079645 with a filing date of Apr. 19, 2016, designating the United States, now pending, and further claims priority to Chinese Patent Application No. 201510186456.6 with a filing date of Apr. 20, 2015, designating the United States, now pending. The content of the aforementioned applications, including any intervening amendments thereto, are incorporated herein by reference.

TECHNICAL FIELD

The present invention relates to the technical field of energy conservation and energy utilization, and more particularly relates to a condensation system applied to an open-type heat-source tower heat-pump air conditioner system in an air conditioner industry.

BACKGROUND OF THE PRESENT INVENTION

A heat-source tower heat-pump air conditioner system can be used both in winter and summer and is used for cooling in summer and heating in winter so as to realize dual purposes, thereby greatly increasing the device utilization rate and reducing the device idle time. Meanwhile, no pollutant is discharged in an operation process, an influence on an environment is extremely small, and the system is flexible to install and use and has extremely low requirement for buildings. Due to the above advantages, the heat-source tower heat-pump air conditioner system has been widely used. However, in the application process, some problems of the open-type heat-source tower heat-pump air conditioner system emerge gradually. For example, the concentration of an anti-freezing solution is unstable in winter, rain and snow are easy to enter a heat-source tower to cause the loss of the anti-freezing solution, and the anti-freezing solution is easy to drift and scatter when the wind speed of a fan is high; and a phenomenon of unstable energy efficiency of the device occurs frequently due to instability of the concentration of the anti-freezing solution, and more particularly, when the concentration of the anti-freezing solution is reduced to a certain degree, a heat pump host cannot work normally and is even burnt down. Therefore, the concentration of the anti-freezing solution of the open-type heat-source tower heat-pump air conditioner system must be monitored and adjusted in time.

At present, in an actual application process of the open-type heat-source tower heat-pump air conditioner system, there is no uniform standard for monitoring and adjusting the concentration of the anti-freezing solution. At present, in the sole standard related to the heat-source tower heat-pump system in China—China Engineering Construction Association Standard—Technical Specification for Application of Heat-source Tower Heat-Pump System, only an interface, an emission standard, anti-corrosion measures, an emission amount and the like of a heat-source tower anti-freezing solution concentration apparatus are basically defined, and no specific data and evidence are given. Technologies adopted by the concentration apparatus is only designated to adopt a reverse osmosis and negative-pressure evaporation concentration way; in the specification, only "reverse osmosis water treatment device" and "general technical requirements for multi-effect distilled seawater desalting apparatus" are recommended as reference product standards; therefore, it can be known that the existing heat-source tower heat pump in China lacks of standards for the concentration process and device of the heat-source tower heat pump anti-freezing solution. The concentrations of the anti-freezing solutions in various heat-source tower heat-pump air conditioner systems in China have no legal basis at present. For convenience, users of the heat-source tower heat-pump air conditioner systems add an anti-freezing agent into the anti-freezing solution to increase the concentration of the anti-freezing solution only when the concentration of the anti-freezing solution is low, and a part of low-concentration anti-freezing solution is inevitably discharged to the environment in the process of adding the anti-freezing agent, thereby reducing the economical efficiency of the system and also leading to certain environmental pollution. In order to solve the concentration problem of the anti-freezing solution, a utility model patent "heat-source tower refrigerating and heating energy saving system" with an application number of 2010202822668 adopts a distillation kettle, a preheater, a condenser and a water tank, and in the actual use, a set of heat-pump system and heat supply system needs to be added to absorb the heat so as to distill the anti-freezing solution at a high temperature, so that the concentration efficiency is low. On one hand, initial investment is added, and on the other hand, operation cost is increased. Meanwhile, the distilled anti-freezing solution needs to be discharged out of the system, and the discharged solution inevitably carries the anti-freezing agent, thereby leading to economic loss and environmental pollution. A utility model patent "air-based heat-source tower heat pump apparatus for realizing high-efficiency utilization of regenerated heat" with an application number of 2013103224279 proposes a cooling manner of an overheated refrigerating agent to concentrate the anti-freezing agent. This manner is complex to control, more system components are needed, the heat of the overheated refrigerating agent is greatly consumed in the long-time operation process, the heat capable of being obtained by the system is reduced, and the heat supply efficiency is reduced, leading to insufficiency of the heat supply of the system. A utility model patent "heat-source tower heat pump for realizing solution regeneration and heat reutilization on basis of vacuum boiling" with an application number of 2013103595546 proposes to realize the solution concentration by using the vacuum boiling, and the heat used in the system is from the overheated refrigerating agent, so that the heat supply efficiency is reduced. A vacuum pump needs to be used to vacuumize in the concentration process, and an additional air circulating loop needs to be built. In this system, the system occupies a large building space and is difficult to operate and maintain. An invention patent "solution regeneration apparatus based on throttling flash evaporation and capable of realizing self balance of regenerated energy" with an application number of 201310645186.1 proposes an apparatus with a solution loop, a vapor condensation loop and a low pressure maintaining loop. The apparatus needs to be provided with power apparatuses such as a compressor, a solution pump and the like, so that the system is complex, and more devices need to be controlled.

In order to efficiently concentrate the anti-freezing solution in the heat-source tower heat-pump air conditioner system in a pollution-free manner and ensure the normal safety operation and overall performance stability of the heat-source tower heat-pump system, it is necessary to design a novel high-efficiency anti-freezing solution concentration apparatus with low operation expense.

SUMMARY OF PRESENT INVENTION

An objective of the present invention is to provide a wet evaporation-based cold concentration system used in a heat-source tower heat-pump air conditioner system to simply and efficiently concentrate an anti-freezing solution without influencing an environment.

The objective of the present invention is realized through the following technical solution: a wet evaporation-based cold concentration system includes a wet evaporator, a storage pool, a concentration pool, a concentration circulating pump, a storage pump, a supplementing pump, a heat source tower and a heat pump; a fluid baffle is arranged in the wet evaporator, and the fluid baffle divides the wet evaporator into a left area and a right area: a wet evaporation area and a power area; an upper portion of the wet evaporation area is provided with a spraying pipeline, the spraying pipeline is provided with a spray nozzle, and an inlet of the spraying pipeline is connected with an outlet of the concentration circulating pump through a pipeline; a lower portion of the wet evaporation area is provided with a water storage pool, and the lower portion of the water storage pool is connected with the concentration pool through a pipeline; an inlet of the concentration circulating pump is connected with the concentration pool through a pipeline; a fan is installed in the power area; one side of the wet evaporation area is provided with an air inlet, and one side of the power area is provided with an air outlet; the concentration pool is connected with a cooling water return main pipe of the heat-source tower heat-pump air conditioner system through a pipeline; the storage pool is connected with an outlet of the storage pump through a pipeline, and an inlet of the storage pump is connected with the concentration pool through a pipeline; and the storage pool is connected with an inlet of the supplementing pump through a pipeline, and an outlet of the supplementing pump is connected with the cooling water return main pipe of the heat-source tower heat-pump air conditioner system through a pipeline.

As the further optimization of the present solution, a connection pipe between the concentration pool and the cooling water return main pipe is provided with an electromagnetic valve, a connection pipe between the storage pump and the concentration pool is provided with an electromagnetic valve, a connection pipe between the storage pool and the supplementing pump is provided with an electromagnetic valve, and a connection pipe between the cooling water return main pipe and the heat pump is provided with an electromagnetic valve.

As the further optimization of the present solution, the cooling water return main pipe is provided with a concentration detector.

As the further optimization of the present solution, a concentration detector is installed in the concentration pool.

As the further optimization of the present solution, the fan is a cross-flow fan or an axial-flow fan.

Compared with the prior art, the wet evaporation-based cold concentration system of the present invention has the following advantages:

1. Only by virtue of the heat and mass exchange between low-temperature air and the anti-freezing solution, the concentration of the anti-freezing solution is increased through the low-temperature wet evaporation of the anti-freezing solution in the low-temperature air, and no other device is needed for assisting the heating or dehumidification, so that compared with the existing device and invention patent, the present invention has less initial investment and simple and convenient operation, and can be directly applied to any open-type heat-source tower heat-pump air conditioner system.

2. The present invention is low in operation expense; only one concentration circulating pump and one fan are needed in the operation process, and the operation time of other devices such as the storage pump and the supplementing pump is very short.

3. Compared with the measure for increasing the concentration of the anti-freezing solution by adding an anti-freezing agent, the present invention saves a great number of anti-freezing agents, and reduces pollution and waste caused by the anti-freezing solution in the emission process.

4. The operation way of the present invention is flexible; and the cold concentration system can be used both in a power-on operation period and a power-off period of the heat-source tower heat-pump air conditioner system and can be used without considering outside air temperature and weather conditions, and rainy and snowy weather does not have any influence on normal work of the present system.

DESCRIPTION OF THE DRAWINGS

The present invention is further described below in detail in combination with drawings.

FIG. 1 is a structural schematic diagram of the present invention.

In the FIGURE, 1: wet evaporator; 2: spraying pipeline; 3: air inlet; 4: air outlet; 5: fan; 6: fluid baffle; 7: water storage pool; 8: storage pool; 9: concentration pool; 10: heat source tower; 11: heat pump; 12: concentration circulating pump; 13: storage pump; 14: supplementing pump; and 15: cooling water return main pipe.

DETAILED DESCRIPTION OF PREFERRED EMBODIMENTS

As shown in FIG. 1, a wet evaporation-based cold concentration system of the present invention includes a wet evaporator 1, a storage pool 8, a concentration pool 9, a concentration circulating pump 12, a storage pump 13, a supplementing pump 14, a heat source tower 10 and a heat pump 11; a fluid baffle 6 is arranged in the wet evaporator 1, and the fluid baffle 6 divides the wet evaporator 1 into a left area and a right area: a wet evaporation area 1-1 and a power area 1-2; an upper portion of the wet evaporation area 1-1 is provided with a spraying pipeline 2, the spraying pipeline 2 is provided with a spray nozzle, and an inlet of the spraying pipeline 2 is connected with an outlet of the concentration circulating pump 12 through a pipeline; a lower portion of the wet evaporation area 1-1 is provided with a water storage pool 7, and the lower portion of the water storage pool 7 is connected with concentration pool 9 through a pipeline; an inlet of the concentration circulating pump 12 is connected with the concentration pool 9 through a pipeline; a fan 5 is installed in the power area 1-2; one side of the wet evaporation area 1-1 is provided with an air inlet 3, and one side of the power area 1-2 is provided with an air outlet 4; the concentration pool 9 is connected with a cooling water return main pipe 15 of the heat-source tower heat-pump air conditioner system through a pipeline; the storage pool 8 is connected with an outlet of the storage pump 13 through a pipeline, and an inlet of the storage pump 13 is connected with the concentration pool 9 through a pipeline; and the storage pool 8 is connected with an inlet of the supplementing pump 14 through a pipeline, and an outlet of the supplementing pump 14 is connected with the cooling water return main pipe 15 of the heat-source tower heat-pump air conditioner system through a pipeline.

A connection pipe between the concentration pool 9 and the cooling water return main pipe 15 is provided with an electromagnetic valve A, a connection pipe between the storage pump 13 and the concentration pool 9 is provided with an electromagnetic valve B, a connection pipe between the storage pool 8 and the supplementing pump 14 is provided with an electromagnetic valve C, a connection pipe between the cooling water return main pipe 15 and the heat pump 11 is provided with an electromagnetic valve D, the cooling water return main pipe 15 is provided with a concentration detector, a concentration detector is installed in the concentration pool 9, and the fan 5 is a cross-flow fan or an axial-flow fan.

A working process of the wet evaporation-based cold concentration system of the present invention is as follows:

1. During the operation of the heat-source tower heat-pump air conditioner system, the electromagnetic valve A and the electromagnetic valve D are opened, and the electromagnetic valve B and the electromagnetic valve C are closed.

2. The anti-freezing solution in the cooling water return main pipe 15 flows into the concentration pool 9.

3. The concentration detector installed on the cooling water return main pipe 15 detects the concentration of the anti-freezing solution in the pipe; and when the concentration is lower than a required concentration, the concentration circulating pump 12 is switched on, and the fan 5 is switched on.

4. The low-temperature anti-freezing solution is sprayed out into the wet evaporation area 1-1 via the spray nozzle on the spraying pipeline 2; the external low-temperature air enters the wet evaporation area 1-1 via the air inlet 3 under the effect of the fan 5 to perform the heat-wet exchange with the falling anti-freezing solution; since the vapor partial pressure in the anti-freezing solution is higher than the vapor partial pressure of the external wet air, the water in the anti-freezing solution is vaporized into the air to become vapor; and after the humidity is increased, the low-temperature air flows through a water baffle 6 and is discharged from the air outlet 4.

5. The water of the anti-freezing solution after the heat-wet exchange is vaporized, the concentration of the anti-freezing solution is increased, the anti-freezing solution after the concentration is increased falls into the water storage pool 7 and flows into the concentration pool 9 via the pipeline, thereby completing the cycling.

6. The concentration detector installed in the concentration pool 9 detects the concentration of the anti-freezing solution in the concentration pool; when the concentration is lower than the required concentration, the concentration circulating pump 12 and the fan 5 are kept to operate; and when the concentration of the anti-freezing solution is increased to the required concentration, the concentration circulating pump 12 and the fan 5 are stopped from operating.

7. When the concentration circulating pump 12 is stopped from operating, the electromagnetic valve A is closed, the electromagnetic valve B is opened, the storage pump 13 is switched on, the anti-freezing solution in the concentration pool 9 is transferred into the storage pool 8, and then the electromagnetic valve B is closed.

8. When the concentration detector in the cooling water return main pipe 15 detects that the concentration of the anti-freezing solution is relatively low, the electromagnetic valve C is opened, the supplementing pump 14 is switched on, and the anti-freezing solution in the storage pool 8 is injected into the cooling water return main pipe 15.

9. During the period that the heat-source tower heat-pump air conditioner system is stopped from operating, the electronic magnetic valve A is opened, the electromagnetic valve B is closed, and the electromagnetic valve C and the electromagnetic valve D are closed.

10. The concentration circulating pump 12 is switched on; the fan 5 is switched on; after the concentration detector installed in the concentration pool 9 detects that the concentration of the anti-freezing solution reaches a standard, the concentration circulating pump 12 is switched off, the fan 5 is switched off, and the electromagnetic valve A is closed.

The above only describes specific embodiments of the present invention. However, a protection scope of the present invention is not limited to this. Any change or replacement conceived by any skilled in the art without contributing creative work in the technical scope disclosed in the present invention shall fall within the protection scope of the present invention. Therefore, the protection scope of the present invention shall be subjected to the protection scope defined by the claims.

We claim:

1. A wet evaporation-based cold concentration system, comprising:
    a wet evaporator (1), a storage pool (8), a concentration pool (9), a concentration circulating pump (12), a storage pump (13), a supplementing pump (14), a heat source tower (10) and a heat pump (11), wherein
    a fluid baffle (6) is arranged in the wet evaporator (1); the fluid baffle (6) divides the wet evaporator (1) into a left area and a right area: a wet evaporation area (1-1) and a power area (1-2); an upper portion of the wet evaporation area (1-1) is provided with a spraying pipeline (2), the spraying pipeline (2) is provided with a spray nozzle, and an inlet of the spraying pipeline (2) is connected with an outlet of the concentration circulating pump (12) through a pipeline; a lower portion of the wet evaporation area (1-1) is provided with a water storage pool (7), and a lower portion of the water storage pool (7) is connected with the concentration pool (9) through a pipeline; an inlet of the concentration circulating pump (12) is connected with the concentration pool (9) through a pipeline; a fan (5) is arranged in the power area (1-2); one side of the wet evaporation area (1-1) is provided with an air inlet (3), and one side of the power area (1-2) is provided with an air outlet (4); and
    the concentration pool (9) is connected with a cooling water return main pipe (15) of a heat-source tower heat-pump air conditioner system through a pipeline; the storage pool (8) is connected with an outlet of the storage pump (13) through a pipeline, and an inlet of the storage pump (13) is connected with the concentration pool (9) through a pipeline; and the storage pool (8) is connected with an inlet of the supplementing pump (14) through a pipeline, and an outlet of the supplementing pump (14) is connected with the cooling water return main pipe (15) of the heat-source tower heat-pump air conditioner system through a pipeline.

2. The wet evaporation-based cold concentration system according to claim 1, wherein a connection pipe between the concentration pool (9) and the cooling water return main pipe (15) is provided with an electromagnetic valve (A), a connection pipe between the storage pump (13) and the concentration pool (9) is provided with an electromagnetic valve (B), a connection pipe between the storage pool (8) and the supplementing pump (14) is provided with an electromagnetic valve (C), and a connection pipe between the cooling water return main pipe (15) and the heat pump (11) is provided with an electromagnetic valve (D).

3. The wet evaporation-based cold concentration system according to claim 1, wherein the cooling water return main pipe (15) is provided with a concentration detector, and a concentration detector is installed in the concentration pool (9).

4. The wet evaporation-based cold concentration system according to claim 1, wherein the fan (5) is a cross-flow fan or an axial-flow fan.

* * * * *